(12) United States Patent
Valva et al.

(10) Patent No.: US 10,669,873 B2
(45) Date of Patent: Jun. 2, 2020

(54) INSULATED SEAL SEAT

(71) Applicant: United Technologies Corporation, Farmington, CT (US)

(72) Inventors: Christopher M. Valva, Manchester, CT (US); Christopher T. Anglin, Manchester, CT (US); Brian P. Cigal, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 3 days.

(21) Appl. No.: 15/481,091

(22) Filed: Apr. 6, 2017

(65) Prior Publication Data

US 2018/0291755 A1 Oct. 11, 2018

(51) Int. Cl.
| | |
|---|---|
| *F01D 11/00* | (2006.01) |
| *F01D 25/16* | (2006.01) |
| *F01D 25/08* | (2006.01) |
| *F16J 15/16* | (2006.01) |
| *F01D 25/18* | (2006.01) |
| *F02C 7/28* | (2006.01) |

(52) U.S. Cl.
CPC .......... *F01D 11/003* (2013.01); *F01D 11/005* (2013.01); *F01D 25/08* (2013.01); *F01D 25/162* (2013.01); *F01D 25/183* (2013.01); *F02C 7/28* (2013.01); *F16J 15/16* (2013.01); *F05D 2220/32* (2013.01); *F05D 2240/60* (2013.01); *F05D 2260/231* (2013.01); *F05D 2300/611* (2013.01); *F05D 2300/612* (2013.01); *F05D 2300/613* (2013.01)

(58) Field of Classification Search
CPC ......... F01D 11/003; F01D 25/08; F16J 15/16; F05D 2300/612; F05D 2300/613; F05D 2300/614
See application file for complete search history.

(56) References Cited

U.S. PATENT DOCUMENTS

| | | | | |
|---|---|---|---|---|
| 3,318,515 | A | * | 5/1967 | Jones ...................... F02B 55/08 418/178 |
| 3,741,679 | A | * | 6/1973 | Johnston ............... F04D 29/126 277/362 |
| 3,905,605 | A | * | 9/1975 | Hubner ................. F16J 15/3404 277/360 |
| 3,914,072 | A | * | 10/1975 | Rowley ................. F04D 29/126 277/371 |
| 4,047,740 | A | * | 9/1977 | Young ................... F16L 51/025 285/226 |
| 5,350,599 | A | * | 9/1994 | Rigney ................. C23C 14/083 427/255.7 |
| 6,155,040 | A | * | 12/2000 | Sasaki ...................... F01D 5/00 416/95 |
| 7,431,303 | B2 | | 10/2008 | Dahlheimer |

(Continued)

FOREIGN PATENT DOCUMENTS

FR 2985762 A1 7/2013

OTHER PUBLICATIONS

EP search report for EP18166036.6 dated Oct. 17, 2018.

*Primary Examiner* — Eugene G Byrd
(74) *Attorney, Agent, or Firm* — Getz Balich LLC

(57) ABSTRACT

An insulated seal seat assembly comprises a shaft configured and arranged to rotate about an axial axis, a seal seat that is secured to the shaft, and a thermal insulator configured and arranged radially between the shaft and the seal seat.

10 Claims, 3 Drawing Sheets

(56) References Cited

U.S. PATENT DOCUMENTS

| | | | |
|---|---|---|---|
| 7,754,350 B2 | 7/2010 | Freling et al. | |
| 7,935,431 B2 * | 5/2011 | Poncin | B22D 19/06 |
| | | | 428/457 |
| 8,530,050 B2 | 9/2013 | Ross et al. | |
| 8,857,818 B2 * | 10/2014 | Quarmby | F16J 15/348 |
| | | | 277/306 |
| 9,163,522 B2 * | 10/2015 | Davis | F01D 11/025 |
| 9,410,556 B2 | 8/2016 | Miller et al. | |
| 9,488,184 B2 | 11/2016 | Selkin et al. | |
| 9,624,784 B2 * | 4/2017 | Hafner | F01D 11/001 |
| 2005/0249602 A1 * | 11/2005 | Freling | B22F 5/009 |
| | | | 416/241 B |
| 2006/0019087 A1 * | 1/2006 | Mazzola | F01D 5/288 |
| | | | 428/323 |
| 2008/0118355 A1 * | 5/2008 | Buttner | F01D 5/147 |
| | | | 416/95 |
| 2009/0121441 A1 | 5/2009 | Miller et al. | |
| 2011/0038718 A1 * | 2/2011 | Aschenbruck | F01D 11/001 |
| | | | 415/173.1 |
| 2011/0250056 A1 | 10/2011 | Munson | |
| 2011/0250067 A1 * | 10/2011 | Schlienger | F01D 11/003 |
| | | | 415/230 |
| 2013/0136584 A1 * | 5/2013 | Dierberger | F01D 5/288 |
| | | | 415/177 |
| 2013/0149121 A1 * | 6/2013 | Munshi | F01D 25/08 |
| | | | 415/178 |
| 2013/0330569 A1 * | 12/2013 | Peters | F02C 7/24 |
| | | | 428/613 |
| 2013/0344349 A1 * | 12/2013 | Hugot | C23C 24/082 |
| | | | 428/610 |
| 2014/0150262 A1 * | 6/2014 | Le Borgne | B29C 70/088 |
| | | | 29/889.3 |
| 2014/0327212 A1 * | 11/2014 | Lowe | F16J 15/16 |
| | | | 277/345 |
| 2015/0247411 A1 * | 9/2015 | Care | B23P 15/04 |
| | | | 416/230 |
| 2015/0368437 A1 * | 12/2015 | Doering | C08K 7/18 |
| | | | 277/434 |
| 2016/0153300 A1 | 6/2016 | Carrieres | |
| 2016/0369642 A1 * | 12/2016 | Himes | F01D 11/003 |

\* cited by examiner

INSULATED SEAL SEAT

BACKGROUND OF THE INVENTION

1. Technical Field

The present disclosure relates generally to seals for gas turbine engines. More particularly, the disclosure relates to a seal seat that includes an insulator thermally separating the seal seat from and shaft onto it is rotatably secured.

2. Background Information

A gas turbine engine component, such as a seal seat/plate in a rotary seal mechanism, is often subject to high friction and high temperature operating conditions. A rotary seal mechanism separates two compartments of the gas turbine engine. A rotary seal mechanism typically includes a first component formed of a hard material, such as a carbon seal, that at least in part contacts a surface of a second component formed of a softer material, such as a seal seat/plate, in order to segregate two or more compartments of the gas turbine engine. In some applications, the seal plate rotates as the carbon seal remains fixed, while in other applications, the carbon seal rotates as the seal plate remains fixed. As the seal seat and carbon seal contact one another, the operating temperature and friction levels of both components increase.

One method of cooling the seal seat is to spray oil on the non-sealing side of the seat. However, this may not remove enough heat, and may result in residual heat generated from seal friction being transferred into the shaft on which the seal seat is mounted. The transmitted heat can locally increase the temperature of the shaft, which can subsequently result in reduced strength of the material at this location. This can be problematic when the area of the shaft where the seat is mounted is under high stress. Other design constraints may prohibit the use of an oil passage under the seat for cooling, which may help mitigate this problem. It is desirable to keep this additional heat from entering the shaft in order to maintain optimal material properties. It would be desirable to have improved thermal management.

SUMMARY OF THE DISCLOSURE

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to an insulated seal seat assembly. The insulated seat assembly may comprise a shaft configured and arranged to rotate about an axial axis. The insulated seat assembly may further comprise a seal seat that is secured to the shaft and a thermal insulator configured and arranged radially between the shaft and the seal seat.

The thermal insulator may comprise a ceramic fiber felt.
The thermal insulator may comprise an elastomeric foam.
The elastomeric foam may comprise silicone.
The elastomeric foam may comprise Viton foam.
The thermal insulator may comprise a plurality of longitudinally spaced stand-offs that define a plurality of air gap between the seal seat and the shaft.
The thermal insulator may comprise a ceramic thermal barrier coating.

According to another aspect of the present disclosure, an insulated seal seat assembly is provided. The insulated seat assembly may comprise a gas turbine engine shaft configured and arranged to rotate about an axial axis. The insulated seat assembly may also comprise an annular seal seat that is rotatably secured to the shaft. The insulated seat assembly may also comprise a carbon seal that contacts a face of the seal seat as the seal seat rotates to contain oil within a first compartment partially formed by the face of the seal seat and thermal insulation configured and arranged radially between the shaft and the seal seat.

The thermal insulation may comprise at least one ceramic fiber felt or elastomeric foam.
The thermal insulation may comprise an elastomeric foam.
The thermal insulation may comprise silicone.
The thermal insulation comprises Viton foam.
The thermal insulation comprises a longitudinally spaced stand-off that defines a plurality of air gaps between the seal seat and the shaft.
The insulated seat assembly may also comprise a second thermal insulator placed between an axial face of the shaft and an adjacent axial face of the seal seat.

According to another aspect of the present disclosure, a bearing compartment for a gas turbine engine is provided. The bearing compartment may comprise an engine drive shaft. The bearing compartment may also comprise a rotating annular seal plate mounted to a radial outer surface of the drive shaft, the seal plate being axially biased against a radially extending portion of the drive shaft, the seal plate and the radially extending portion of the drive shaft forming a surface of an oil compartment within the bearing compartment, and the seal plate formed from a metal alloy and wherein a thermal insulator is disposed between the seal plate and one or both of the radial outer surface of the drive shaft and the radially extending portion of the drive shaft.

The thermal insulator may comprise a ceramic fiber felt.
The thermal insulator may comprise an elastomeric foam.
The thermal insulator may comprise a plurality of longitudinally spaced stand-offs that define a plurality of air gap between the seal seat and the shaft.
The thermal insulator may comprise a ceramic thermal barrier coating.
The insulated seal seat assembly may also comprise a second thermal insulator placed between an axial face of the shaft and an adjacent axial face of the seal seat.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
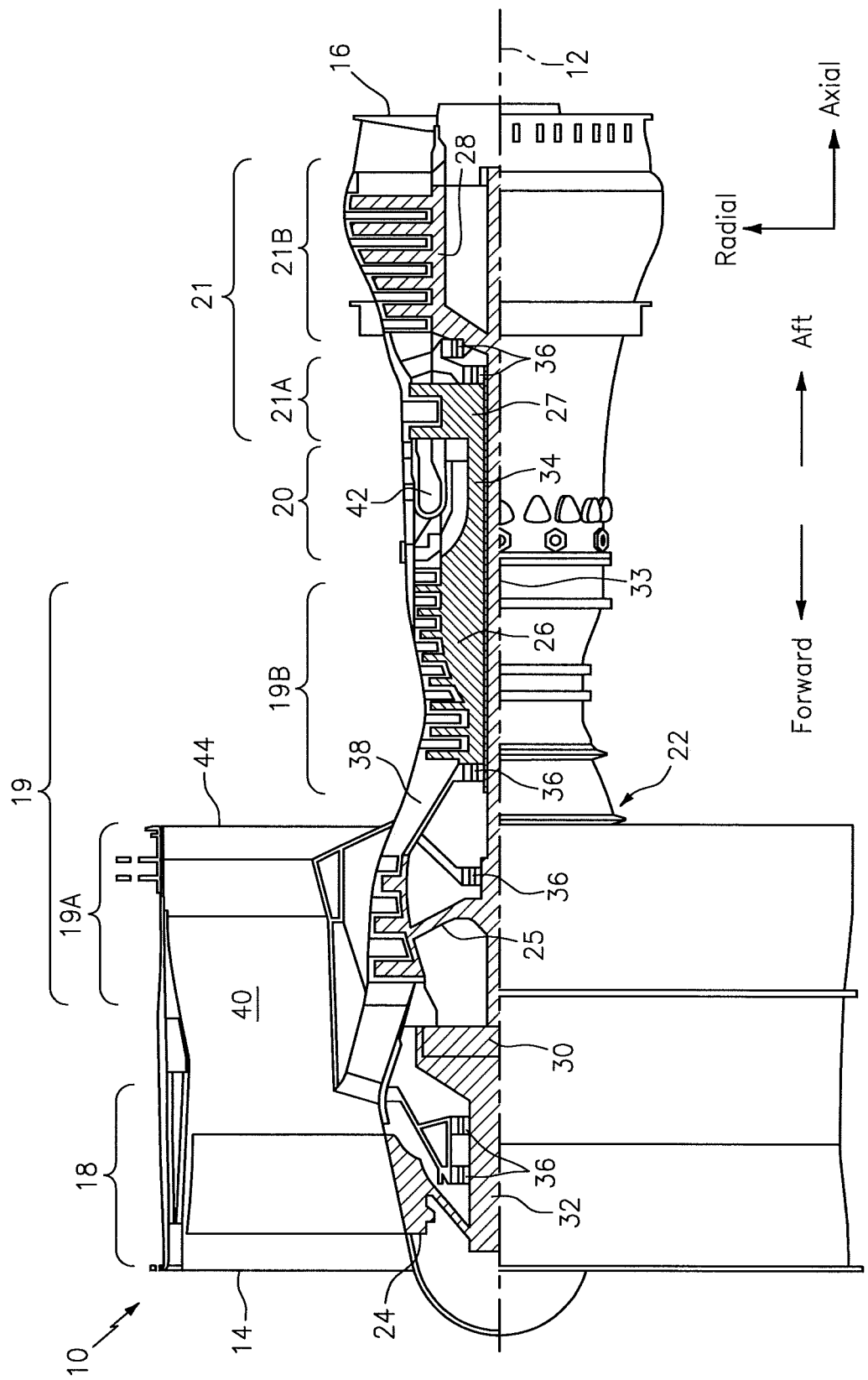
FIG. 1 is a side cutaway illustration of a geared turbine engine.

It is noted that various connections are set forth between elements in the following description and in the drawings (the contents of which are incorporated in this specification by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2:
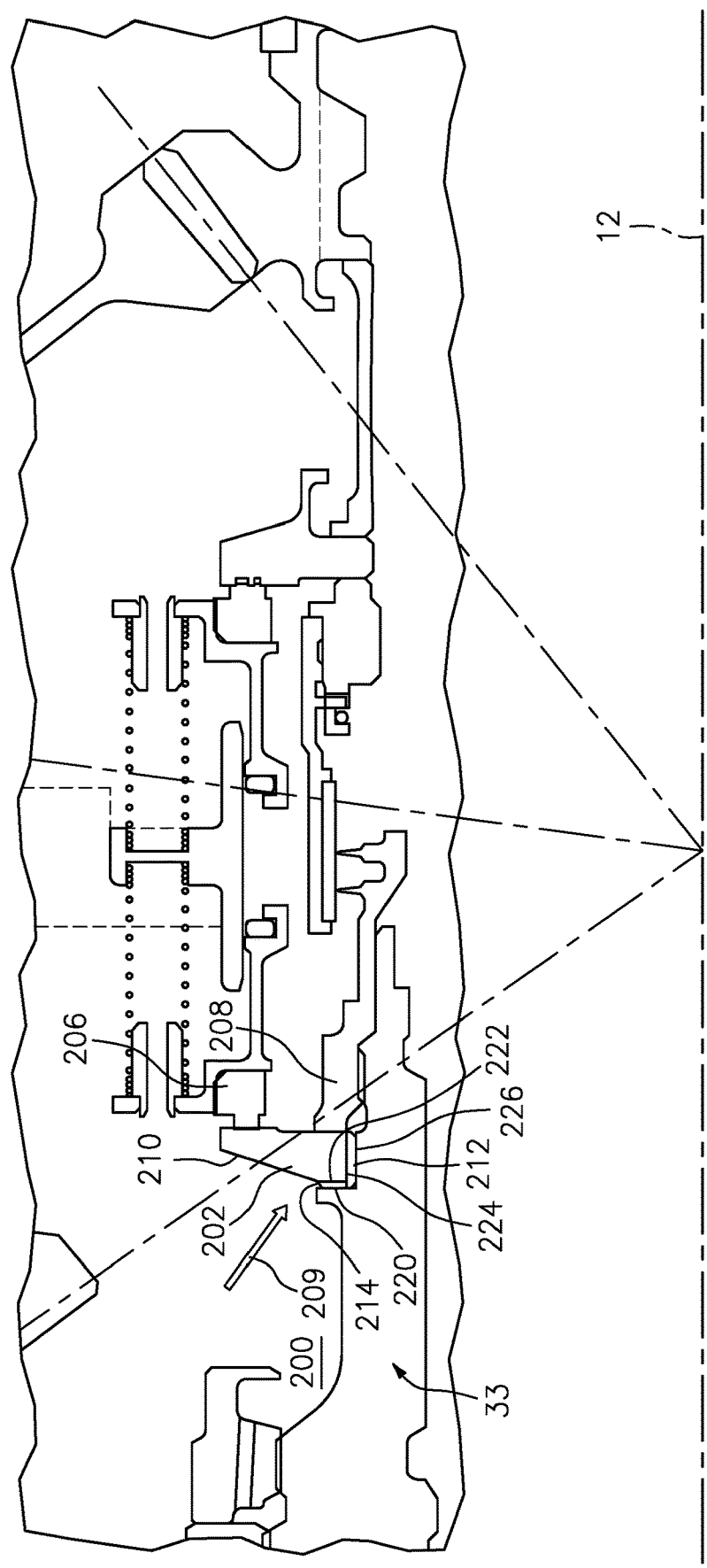
FIG. 2 is an illustration of a section of a mid-bearing compartment of the gas turbine engine.

FIG. 2 is an illustration of a portion of a mid-bearing compartment 200 of a gas turbine engine. The compartment includes a rotating annular seal seat/plate 202 that is mounted to the low speed shaft 33, and a seal 206 (e.g., carbonaceous such as a carbon seal) for containing oil within the compartment 200. The annular seal seat 202 may be made of metal alloy, such as steel, a nickel alloy, or combinations thereof. A nut 208 applies an axial force against the seal seat 202 to operably position the seal seat with respect to the shaft and the stationary seal 206. The rotating seal seat 202 is cooled with oil 209 to prevent overheating. One cooling technique is to spray oil 209 on non-sealing side 210 of the seal seat 202. However, this is not the most effective cooling method, and may result in residual heat generated from seal friction being transferred into the shaft 33 on which the seal seat 202 is mounted. This heat can locally increase the temperature of the shaft, which may result in reduced strength of the material at this location. This can be problematic when the area of the shaft where the seat is mounted is under high stress. Other design constraints may prohibit the use of an oil passage under the seat for cooling, which would help mitigate this problem.

To keep this additional heat from entering the shaft, an insulator 212 is located between a radially outer surface 226 of the shaft 33 and a radially inner surface 224 of the seal seat 202. The insulator 212 may be a discrete layer of material, such as for example ceramic fiber felt, elastomeric foam, et cetera. The elastomeric foam may include, for example, silicone or Viton foam. The insulator 212 may include adhesives on its face surfaces to ensure proper bonding to the shaft and the seal seat. The insulator may have a thickness of about 0.05 inches (1.27 millimeters)-0.10 inches (2.54 millimeters).

The insulator 212 limits the heat transfer from the seal seat 202 into the shaft 33. In one embodiment, if the insulation is a lightweight material with relatively low strength (e.g., ceramic fiber felt or elastomeric foam), then the thickness of the insulator should be such that the insulator is kept radially below the axial load bearing faces of the seal seat 202 that are clamped between the nut 208 and the shaft 33. This prevents deformation of the insulation, while ensuring that adequate clamping load is maintained. If a high strength insulation or thermal barrier coating is used (e.g., a ceramic coating), it may be possible to coat all of the interface locations between the seat 202 and the shaft 33 to further limit the amount of heat transfer.

To further reduce the amount of heat transfer, a second insulator 214 may be placed between a radially extending surface 220 of the shaft 33 and an adjacent radially extending surface 222 of the seal seat 202. One of ordinary skill will appreciate that the second insulator 214 be of high enough strength to withstand the clamping load applied by the nut 208.

Figure 3:
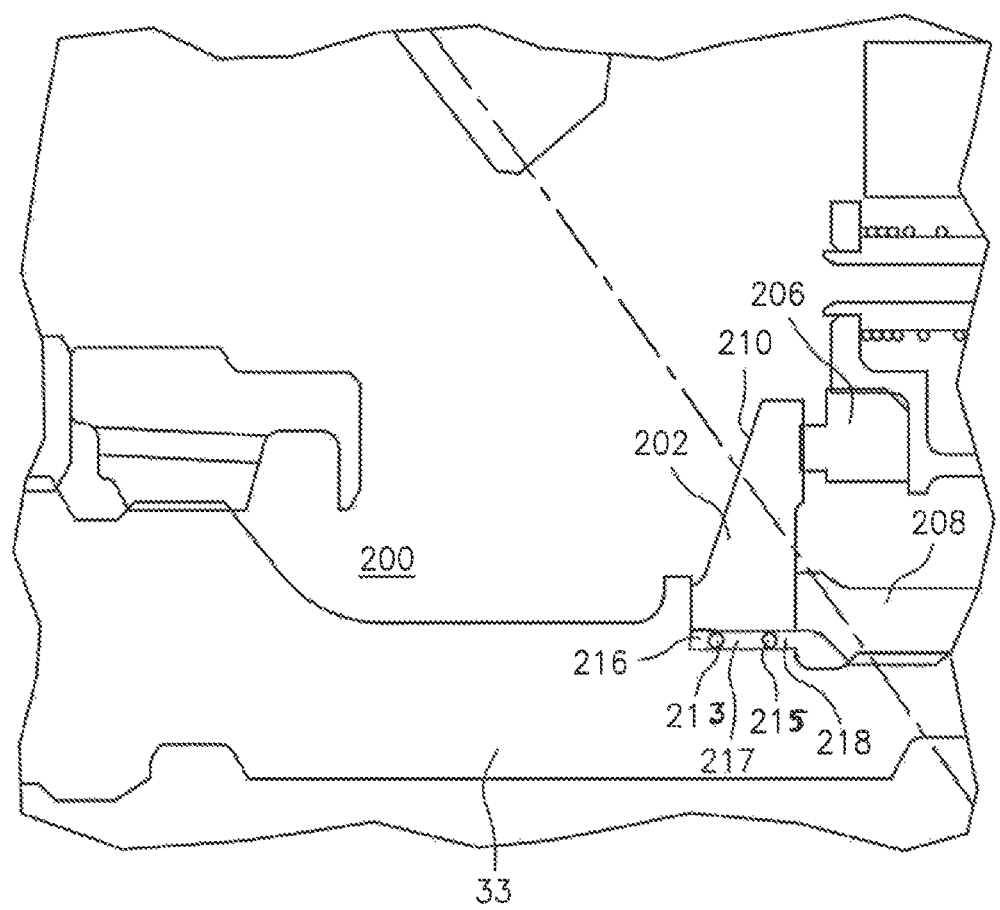
FIG. 3 is an illustration of an alternative embodiment of an insulator located between the seal seat and the shaft.

FIG. 3 is an illustration of an alternative embodiment of an insulator located between the seal seat and the shaft. In this embodiment a plurality of longitudinally spaced stand-offs 213, 215 define a plurality of air gaps 216-218 between the seal seat 202 and the shaft 33. In one embodiment, the stand-offs 213, 215 may be formed, for example, from corrugated metal or even a thin metal ring. It is contemplated in one embodiment that a single longitudinally spaced stand-off may be used to define first and second longitudinally adjacent air gaps radially between the seal seat and the shaft.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An insulated seal seat assembly, comprising:
   a shaft having an axial centerline, the shaft configured to rotate about the axial centerline;
   a seal seat that is mounted to the shaft between a nut and a radially extending surface of the shaft; and
   a thermal insulator located radially between and in contact with a radially inner surface of the seal seat and a radially outer surface of the shaft,
   where the thermal insulator comprises a plurality of axially spaced stand-offs extending radially between and in contact with the seal seat and the shaft, the plurality of axially spaced-apart stand-offs defining a plurality of axially spaced air gaps, each of the plurality of axially spaced-apart air gaps disposed opposite a stand-off of the plurality of axially spaced-apart stand-offs from another of the plurality of axially spaced-apart air gaps.

2. An insulated seal seat assembly, comprising:
   a gas turbine engine shaft having an axial centerline, the shaft configured to rotate about the axial centerline;
   an annular seal seat that is mounted to the shaft between a nut and a radially extending surface of the shaft, the seal seat having a non-sealing side which defines at least in part, a compartment;
   a carbon seal in contact with a face of the seal seat as the seal seat rotates, an interface between the seal seat and the seal configured to contain oil within the compartment; and
   thermal insulation located radially between and in contact with a radially inner surface of the seal seat and a radially outer surface of the shaft,
   where the thermal insulator comprises a plurality of axially spaced stand-offs extending radially between and in contact with the seal seat and the shaft, the plurality of axially spaced-apart stand-offs defining a plurality of axially spaced air gaps, each of the plurality of axially spaced-apart air gaps disposed opposite a stand-off of the plurality of axially spaced-apart stand-offs from another of the plurality of axially spaced-apart air gaps.

3. The insulated seal seat assembly of claim 2, further comprising a second thermal insulator located between and in contact with the radially extending surface of the shaft and an adjacent radially extending surface of the seal seat.

4. A bearing compartment for a gas turbine engine, comprising:
   an engine drive shaft;
   a rotating annular seal plate mounted to a radially outer surface of the drive shaft, the seal plate being axially biased against a radially extending surface of the drive shaft, the seal plate and the radially extending portion of the drive shaft forming a surface of an oil compartment within the bearing compartment, and the seal plate formed from a metal alloy,
   where a thermal insulator is disposed radially between and in contact with the seal plate and one or both of the radial outer surface of the drive shaft and the radially extending surface of the drive shaft, and
   where the thermal insulator comprises a plurality of longitudinally spaced stand-offs that define a plurality of air gaps between the seal seat and the shaft.

5. The bearing compartment of claim 4, where the thermal insulator comprises a ceramic fiber felt.

6. The bearing compartment of claim 4, where the thermal insulator comprises an elastomeric foam.

7. The bearing compartment of claim 4, where the thermal insulator comprises a ceramic thermal barrier coating.

8. The insulated seal seat assembly of claim 1, further comprising a second thermal insulator located between and in contact with the radially extending surface of the shaft and an adjacent radially extending surface of the seal seat.

9. The insulated seal seat assembly of claim 1, where the thermal insulator is bonded to the shaft and the seal seat with an adhesive.

10. The insulated seal seat assembly of claim 1, where the thermal insulator has a first thermal conductivity and the seal seat has a second thermal conductivity and where the second thermal conductivity is greater than the first thermal conductivity.

* * * * *